United States Patent [19]

Thompson

[11] 4,382,572

[45] May 10, 1983

[54] MOUNTING APPARATUS FOR REAR-VIEW MIRRORS AND THE LIKE

[76] Inventor: William E. Thompson, R.R. 1, Box 89, Middletown, Ind. 47356

[21] Appl. No.: 226,622

[22] Filed: Jan. 21, 1981

[51] Int. Cl.³ ............................................. B60R 1/02
[52] U.S. Cl. ................................ 248/484; 248/224.1; 403/56; 403/334; 403/344
[58] Field of Search ............... 248/484, 481, 483, 482, 248/73, 223.4, 224.1, 224.2; 403/333, 334, 56; 285/332, 332.1

[56] References Cited

U.S. PATENT DOCUMENTS

| | | |
|---|---|---|
| 240,843 | 5/1881 | Pontius . |
| 408,278 | 8/1889 | White . |
| 409,893 | 8/1889 | Wray . |
| 1,787,734 | 1/1931 | Rowline ............................ 248/73 |
| 2,681,249 | 6/1954 | Zabilka ........................... 248/73 X |
| 3,131,251 | 4/1964 | Ryan ............................ 248/224.1 X |
| 3,367,616 | 2/1968 | Bausch et al. . |
| 4,019,298 | 4/1977 | Johnson ............................ 52/594 |
| 4,225,258 | 9/1980 | Thompson .......................... 403/56 |
| 4,254,931 | 3/1981 | Aikens et al. .................. 248/483 X |

*Primary Examiner*—William H. Schultz
*Assistant Examiner*—Ramón O. Ramirez

*Attorney, Agent, or Firm*—Woodard, Weikart, Emhardt & Naughton

[57] ABSTRACT

A rear-view mirror mounting apparatus for attaching a rear-view mirror to a windshield includes a substantially flat, receiving member and a hollow, inserting member which is slidably received within the receiving member. The receiving member includes a tapered, dovetail-like receiving channel which is symmetrical about the longitudinal centerline of the receiving member. The inserting member is contoured at one end with a spherical element suitable for receipt by a pivot mechanism or similar interconnection means and the opposite end is contoured with a flared, conical shape. The bottom edge of this flared, conical shape includes a leading edge portion, a trailing edge portion and two side edge portions. The two side edge portions are disposed in a first plane and the leading and trailing edge portions are disposed in a second geometric plane parallel to the first, the two side portions are suitably sized and spaced so as to fit beneath the undercut side edges of the receiving channel. Thus, as this inserting member is advanced downwardly in the direction of narrowing taper, the two side edge portions as well as the leading and trailing edge portions make contact with the receiving member at four primary points of contact interference which are approximately 90 degrees apart.

6 Claims, 9 Drawing Figures

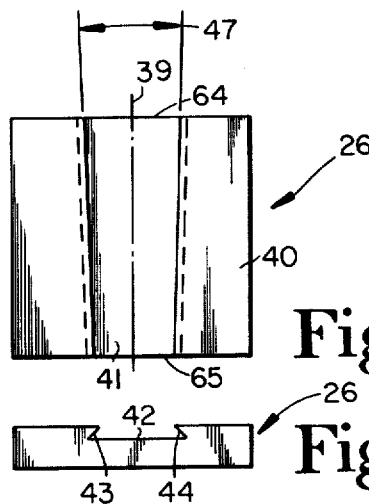
Fig.4
Fig.4A
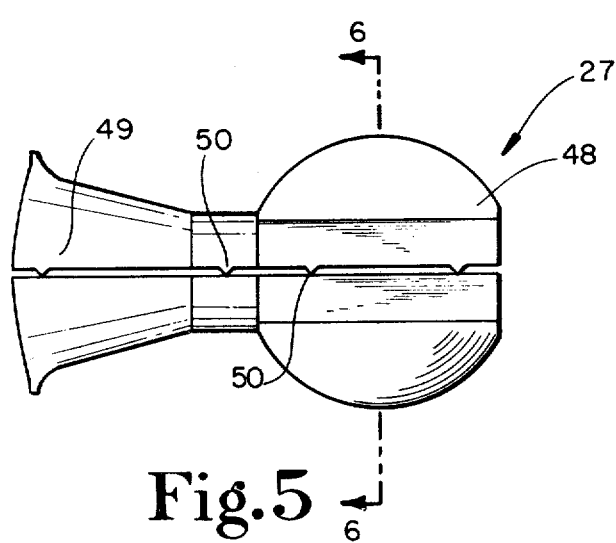
Fig.5
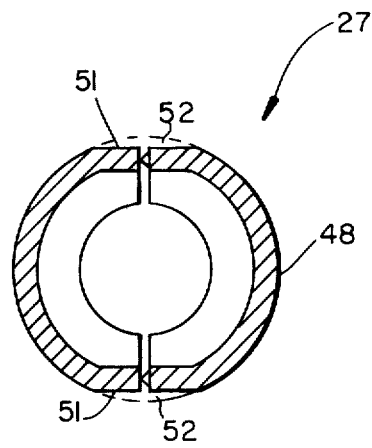
Fig.6
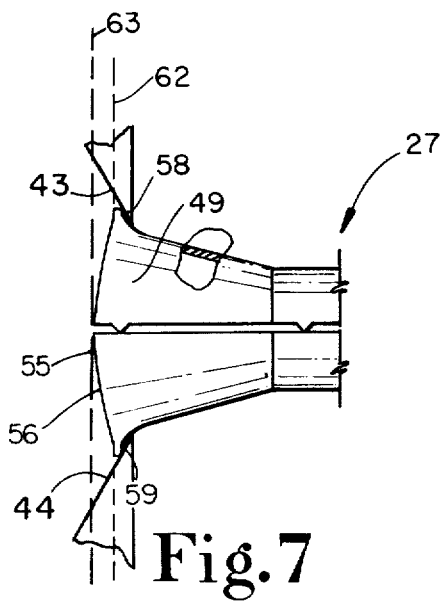
Fig.7
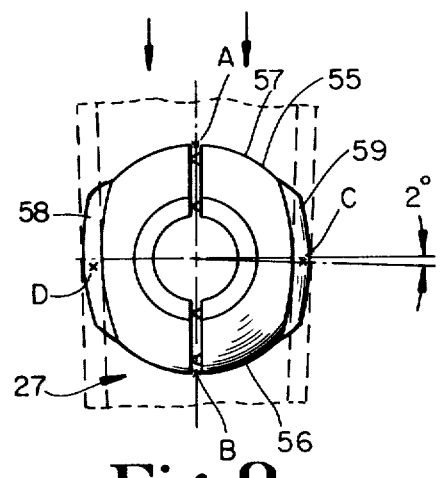
Fig.8

4,382,572

MOUNTING APPARATUS FOR REAR-VIEW MIRRORS AND THE LIKE

BACKGROUND OF THE INVENTION

This invention relates in general to mounting devices and apparatus which entail the assembly of two component parts. More particularly, this invention relates to rear-view mirror mounting apparatus wherein one part is bonded to the inside surface of the windshield and the cooperating part is attached to the back side of the rear-view mirror.

The mounting of rear-view mirrors into automobiles presents to designers an interesting combination of requirements. The component part which is bonded to the inside of the windshield needs to be fairly thin so that windshields can be efficiently stacked for shipment. Next, the connecting assembly between the windshield and the mirror needs to be adjustable in a conical sweep or zone in order for different drivers to focus the mirror to their particular viewing preferences. The mounting apparatus needs to be easily and positively assembled and thereafter remain secure for the life of the automobile. Finally, if there is a failure of the mirror or a need to replace the mirror, the component parts of the mounting apparatus need to be separable without significant difficulty and without causing damage to either the mirror or to the windshield.

The patents listed below disclose various attachment and mounting concepts, many of which involve two mating parts, wherein one part is configured to slidably receive the other part. However, none of these disclosed concepts anticipate nor render obvious the present invention.

| Patent No. | Patentee | Issue Date |
| --- | --- | --- |
| 240,843 | Pontius | 5/03/81 |
| 408,278 | White | 8/06/89 |
| 409,893 | Wray | 8/27/89 |
| 2,801,895 | Gass | 8/06/57 |
| 1,272,899 | Berko | 7/16/18 |
| 3,696,233 | Pulsifer | 10/03/72 |
| 4,019,298 | Johnson, IV | 4/26/77 |
| 3,367,616 | Bausch et al. | 2/06/68 |
| 4,225,258 | Thompson | 9/30/80 |

Pontius discloses a fencepost construction wherein the lower portion of the fencepost is shaped as a partial four-sided pyramid. The base member for the fencepost has an opening with a compatible dovetail-like shape suitable to receive the part pyramid-shaped end of the post.

White discloses a concept for knock-down furniture wherein cylindrical dowel-like cross bars are configured with a conical end portion which fit within recessed keyhole-like depressions. The keyhole-like depressions are undercut along their lower portion so as to receive the conical end of the cross bars after these conical ends are inserted into the larger opening of the keyhole-like shape.

Wray discloses a lock joint for beams wherein the end of a beam is shaped with a dovetail protuberance and the portion into which the beam is locked is adapted to engage and rest on the beam and includes a dovetail socket open at the top. The dovetail socket tapers inwardly as it extends downwardly so as to provide a locking concept for the beams and thereby accepts tolerance variations within the dovetail socket and the dovetail end of the beam.

Gass discloses an interlocked joint construction for structures such as drawers and cabinets and includes a dovetail protuberance on a first member and a similarly shaped dovetailed receiving channel in the mating member. This particular construction concept is somewhat similar to the structure of the Wray patent with the exception that in Gass, the recessed and dovetail-shaped receiving channel is not tapered.

Berko discloses a bathroom fixture wherein an undercut channel receives a mating member, and although a dovetail attachment is illustrated in FIG. 2, this particular disclosure is only believed to be of limited relevancy to the present invention.

Pulsifer discloses an infant feeding device which includes a receptacle member and means for holding the receptacle member in proximity to the infant. The receptacle member includes an opening whereby the bottle can be introduced therein and a slotted end wall portion in which slot the neck portion of the bottle rests, the slot width being less than the diameter of the main body portion of the bottle. The coupling element attached to the bottle holder has a generally dovetail configuration and is somewhat uniform so as to approximate a four-sided pyramid. The coupling member includes a tapered receiving channel and functions similarly to a dovetail joint.

Johnson, IV discloses a dual-tapered dovetail-shaped mortise which is formed within a joist to receive a dual-tapered dovetail-shaped tenon extending from a beam. Laterally oriented cavities are disposed within opposite faces of the mortise to receive corresponding configured ridges formed integral with the mating tenon. The resulting frictional interlock between the mortise and the tenon, created by two forces acting in opposition to one another, rigidly secures the beam to the joist without play therebetween. The dovetail-shaped end of the beam is conventionally just that, but is tapered to correspond to the dovetail shape and taper of the receiving channel. The resulting frictional fit is established between the ridges and cavities and not necessarily between the dovetail end and the dovetail channel.

Bausch et al. discloses a support for rear-vision mirrors which is believed to describe a fairly standard and fairly typical construction within the automotive industry. A diecast metal base member is secured to the windshield and locked within this member is the stem end of a first ball. The ball is received within a cylindrical member and is spring loaded so as to exert a proper tension for adjustment of the mirror. The opposite end of the cylindrical member also includes a ball whose stem portion attaches to the back side of the mirror. The disadvantages with this construction concept are of course the plurality of pieces required in order to make the overall assembly, and the awkwardness of the sliding and pivoting motion between the cylindrical center member and the two ball ends. There is also a lack of durability and rigidity with this construction concept and the overall device of Bausch.

Thompson discloses a pivot mechanism concept which is believed to overcome several of the disadvantages with the Bausch et al. support apparatus for rear-vision mirrors. While the particular concepts set forth in this patent have widespread applicability, one application is in the automotive industry for mounting rear-vision mirrors. Nonetheless, there remain concerns with the mounting apparatus for such mirrors, namely an inexpensive and reliable way to secure the connection element to the windshield as well as to the mirror. These are the areas focused upon by the present invention.

Those designs which offer a dovetail-shaped, tapering channel, such as Wray, are believed preferred for quick and positive assembly of two mating parts. However, in these designs, the inserted dovetail shape and the shape of the receiving channel are such that there is no top-to-bottom clearance, just side clearance until such time as the taper closes in and wedges the two parts together. In this regard, it is instructive to note that the disclosed dovetail shapes each have a substantially flat base surface and the floor of each channel is also substantially flat. By this approach, there are only two points of force, these two points being on the sides. There are no force points longitudinally for the interference contact between the two parts which would tend to prevent the two parts from rocking and which would tend to prevent the inserted part from backing out of its mating engagement with the receiving part. Additionally, the dovetail inserts disclosed are solid and generally rectangular in cross section and there is no relationship between forces applied to the lateral edges by the sides of the receiving channel and the forces on the front leading edge and the rear trailing edge of the inserting member.

It is believed to be an improvement to these types of dovetail fittings to shape the inserting member as somewhat conical and to initially provide both side clearance and top-to-bottom clearance. Thus, with such a design as the receiving channel narrows, the inserted member is pushed toward the base surface of the channel. With continued advancement toward the lower end of the channel where the taper narrows, the clamping forces applied to the sides are also transmitted to the leading and trailing edges thus providing four primary contact points, each being approximately 90 degrees apart. The presence of these four points of contact (interference fit) result from the contact made on the two outwardly flared edges of the conical end shape and the contact made on the leading and trailing edges of the inserting member. The described four points of contact, each 90 degrees apart on the inserted member, present an interference force upon the conical shell diameter resulting in a reliable spring-force application. The leading and trailing edges are at a low level relative to the two side portions.

The present invention provides a mounting apparatus consistent with the foregoing description and achieves the advantages and improvements outlined. The apparatus of the present invention also provides additional improvements as will be appreciated from the descriptions which follow.

SUMMARY OF THE INVENTION

A mounting apparatus for attaching a first object to a second object according to one embodiment of the present invention comprises an inserting member having a first end adapted for attachment to a first object and a second, opposite end having a hollow, generally conical shape and a receiving member having a first surface adapted for attachment to a second object and a second, opposite surface defining a tapered receiving channel therein, said receiving channel being adapted to slidably receive said second, opposite end and to engage said second, opposite end at several primary points of interference contact as said second, opposite end advances in the direction of narrowing taper.

One object of the present invention is to provide an improved mounting apparatus for attaching two objects together.

Related objects and advantages of the present invention will be apparent from the following description.

BRIEF DESCRIPTION OF THE DRAWINGS

FIGS. 4 and 4A are a front view and an end view, respectively, of a receiving member comprising a portion of the FIG. 1 mounting apparatus.

FIG. 5 is a side elevation view of an inserting member comprising a portion of the FIG. 1 mounting apparatus.

FIG. 6 is a full section view of the FIG. 5 inserting member as taken along line 6—6 in FIG. 5.

FIG. 7 is a partial side elevation view of the FIG. 5 inserting member.

FIG. 8 is a top plan diagrammatic view of the FIG. 5 inserting member received within the FIG. 4 receiving member.

DESCRIPTION OF THE PREFERRED EMBODIMENT

Figure 1:
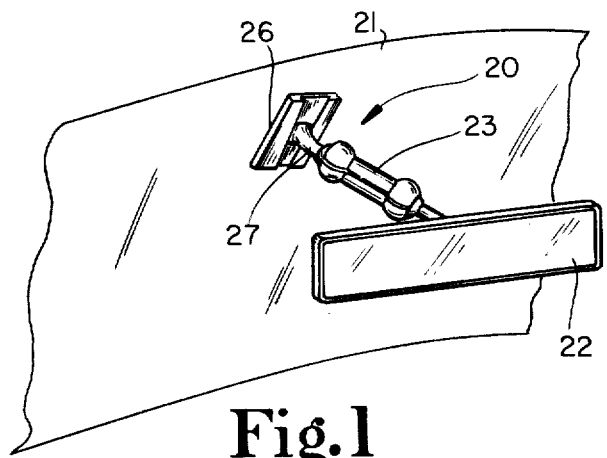
FIG. 1 is a perspective view of a mounting apparatus for a rear-view mirror or similar object according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a mounting apparatus 20 which is constructed in accordance with the present invention and is disposed between an automobile windshield 21 and an automobile rear-view mirror 22. Mounting apparatus 20 connects directly to the windshield at one end and the opposite end of mounting apparatus 20 is fitted within pivot mechanism 23. Although a variety of pivot mechanisms are acceptable for the connection of one end of mounting apparatus 20 to the back side of rear-view mirror 22, a preferred construction is that disclosed by U.S. Pat. No. 4,225,258 which issued Sept. 30, 1980 to William E. Thompson. For its general teachings and in particular, its teachings of the pivot mechanism construction, this U.S. patent is hereby incorporated by reference.

Mounting apparatus 20 includes a receiving member 26 and slidably received therein an inserting member 27. This overall assembly concept permits the receiving member to be bonded to the inside surface of the windshield and extend outwardly to a pivot point of connection to the pivot mechanism. The opposite end of the pivot mechanism is then similarly attached to the rear surface of the rear-view mirror. Each end of the pivot mechanism receives a spherical member in a pivoting relationship so that there is a conical sweep of movement of the type necessary for the driver of the automobile to be able to adjust the rear-view mirror, depending upon his seat position, height and preference as to focus or direction.

Figure 2:
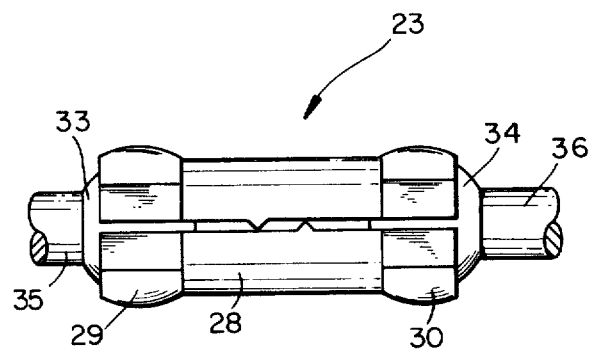
FIG. 2 is a side elevation view of a prior art pivot mechanism concept which comprises a portion of the FIG. 1 assembly.

Referring to FIG. 2, the prior art pivot mechanism in accordance with U.S. Pat. No. 4,225,258 is illustrated in greater detail. This pivot mechanism includes a generally cylindrical socket frame member 28 which includes sphere-receiving end portions 29 and 30. Disposed within each end portion is a different spherical element 33 and 34, respectively, and each spherical element terminates in an outwardly extending arm 35 and 36, respectively. Although the teachings of U.S. Pat. No. 4,225,258 remain applicable to any type of spherical element, the present invention incorporates a very unique type of spherical element whose uniqueness lies both in its method of construction and in its resulting shape and characteristics.

Figure 3:
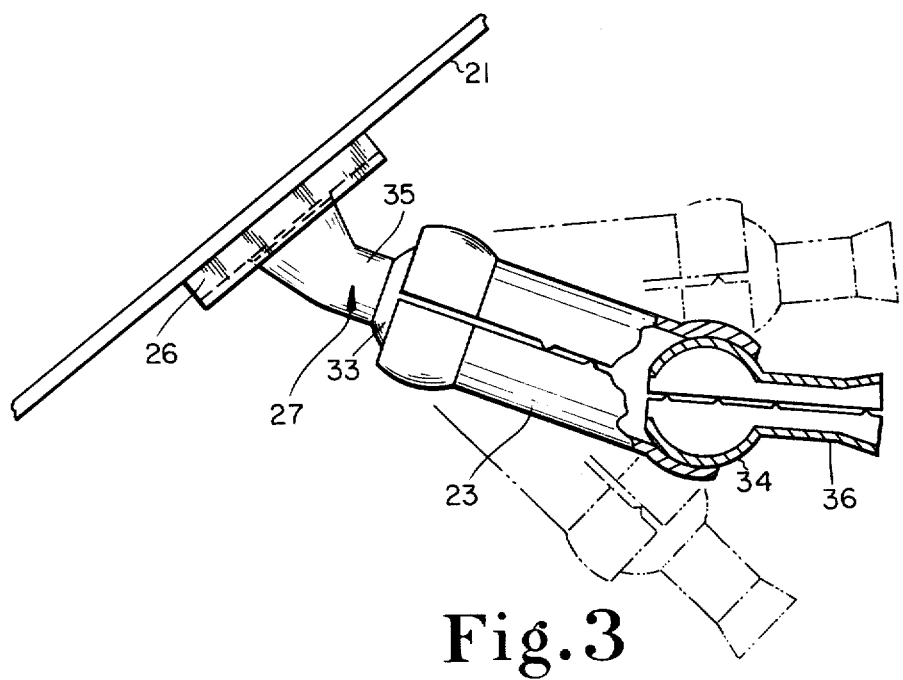
FIG. 3 is a fragmentary, diagrammatic side elevation view of the FIG. 2 connection element as attached to a windshield.

Referring to FIG. 3, the assembly of pivot mechanism 23 and mounting apparatus 20 is illustrated in a side elevation orientation. This particular figure illustrates in greater detail the substantially flat nature of receiving member 26 and the fact that due to windshield incline or curvature, it may be desirable to bend the longitudinal axis of inserting member 27 so that a more central and aligned orientation is provided for mirror 22 placing it normally in a mid-range or central location. By configuring the various component parts in order to dispose the mirror at a location close to its desired location when all of the components are in a mid or central orientation, a maximum degree of adjustment is permitted in all directions. The partial movement of pivot mechanism 23 is illustrated by the phantom lines both to the top and bottom of the solid line illustration. These phantom line illustrations are intended to depict the conical sweep permitted for the pivot mechanism and thus for the rear-view mirror relative to the windshield. Although a similar conical sweep is possible from each end of mechanism 23, the apex of the sweep illustrated is central to the sphere at one end of member 27. Inasmuch as mounting apparatus 20 may find significant applicability for attaching different pairs of objects together, the angular bend placed in inserting member 27 is believed to be somewhat unique for applications such as rear-view mirrors. Consequently, in the FIG. 5 and FIG. 7 detailed illustrations of inserting member 27, this angular bend has been eliminated. Although each spherical element 33 and 34 terminates in an outwardly extending arm 35 and 36, it is the free end of each arm which is uniquely contoured for compatibility with the structure of receiving member 26.

Referring to FIGS. 4 and 4A, receiving member 26 is illustrated in greater detail. As has been explained, this member is substantially flat throughout and by making the receiving member of a relatively thin or shallow depth, windshields are able to be stacked in large numbers for shipment without the thickness of the receiving member causing significant problems. During such shipment, spacers are inserted so as to offset one windshield from the other so that points of high stress concentration do not occur at the location of the receiving member. It is envisioned that of the inside or lower flat surface of the receiving members will be securely cemented or bonded to the inside surface of the windshields, at a precise location, at the time the windshields are fabricated, prior to automobile assembly. Consequently, when the automobiles are moving down the assembly line, it is possible for the attachment of the rear-view mirror be made quickly, positively and reliably, without the use of the conventional set screw lock. The various shape and contour relationships between the receiving member and the inserting member contribute greatly to this ease, convenience and reliability.

Receiving member 26 is generally rectangular in perimeter shape, although virtually any shape would be acceptable, depending upon the designer's preference and the type of automobile. The receiving member is generally symmetrical about longitudinal centerline 39 and disposed within top surface 40 is a generally symmetrical receiving channel 41. The receiving channel has a generally dovetail-like shape in lateral cross section as is illustrated by FIG. 4A. This dovetail-like shape for receiving channel 41 provides a bottom surface 42 and two undercut top surfaces 43 and 44. While receiving channel 41 is illustrated as extending completely across the top surface of the receiving member, it is possible to configure this channel as a blind channel so long as sufficient reduction in width is provided by the taper so that the inserting member is able to be locked in position, by the method to be described hereinafter. Angle 47 represents the angular measurement of the taper of the sides of receiving channel 41 and in the exemplary embodiment, this angular measurement is approximately 4 degrees.

Referring to FIGS. 5 and 6, inserting member is illustrated in greater detail. In the exemplary embodiment, this member is formed from two halves which are aligned and then welded together. This type of construction technique provides a hollow inserting member which has a hollow spherical end 48 and opposite thereto a hollow flared conical end 49. In the exemplary embodiment, one-half of the inserting member includes a spaced series of projections 50 which make contact with the other half of the inserting member. These projections enable the two halves to be held apart except at the location of the projections. By passing an electric current through each projection, a resistance weld is created at each projection thereby joining the two halves together. The problem of scoring and abrasive action between the spherical end 48 of the inserting member and the sphere-receiving end portion of the pivot mechanism, a problem frequently caused by weld flash extending beyond the spherical exterior is in part eliminated by the presence of formed flat portions 51 on the seam line of spherical end 48. Weld flash is further reduced, if not eliminated, by backing the weld with a nonmetallic containment surface. By providing these flat portions along the seam of the two halves of inserting member 27, it should be appreciated that the spherical curvature present with spherical end 48 effectively provides a clearance zone 52 for any weld buildup. Since any buildup does not extend beyond the line of spherical curvature, scoring and abrasive action are eliminated.

Referring to FIG. 7, the flared conical end 49 of inserting member 27 is illustrated in greater detail and as nested within undercut top surfaces 43 and 44. While end 49 has been described as conical in nature, it is to be understood that the bottom edge 55 is actually contoured in perimeter shape in accordance with the illustration of FIG. 8. In this illustration, it is to be noted that bottom edge 55 includes a leading edge portion 56, a trailing edge portion 57 and two side portions 58 and 59. While the resulting perimeter shape may be a combination of something between rectangular and circular, the description of a flared, generally conical end for end 49 of inserting member 27 is accurate and believed descriptive. As is best illustrated by FIG. 7, side portions 58 and 59 each have a slightly convex outer edge and are generally coplanar with one another. Side portions 58 and 59 are disposed in an upper or first geometric plane 62. Similarly, edge portions 56 and 57 extend downwardly and their lowermost portions are coincident with one another and are disposed in a lower or second geometric plane 63.

It is also to be understood that geometric planes 62 and 63 are substantially parallel to each other and their distance of separation is slightly less than the depth of receiving channel 41 in the receiving member 26. This size relationship means that when flared, conical end 49 is inserted into the receiving channel 41 beginning at top end 64, side portions 58 and 59 are placed beneath undercut top surfaces 43 and 44. In this arrangement, it is to be understood that there is lateral clearance between flared conical end 49 and receiving channel 41. Further, there is up and down clearance between these two members extending in a direction from bottom surface 42 to top surface 40. As the inserting member advances toward lower end 65 of the receiving member, the undercut top surfaces 43 and 44 begin to contact the upper surface of side portions 58 and 59 as the tapered receiving channel narrows. This contact by the receiving channel on side portions 58 and 59 pushes the flared conical end downwardly toward surface 42. This downward pushing force causes contact by leading and trailing edge portions 56 and 57 against bottom surface 42. Continued advancement of the inserting member into the receiving channel increases the force of interference contact between bottom surface 42 and the leading and trailing edge portions 56 and 57. While this contact interference is increasing in force level, contact interference begins to increase between undercut top surfaces 43 and 44 and side portions 58 and 59. The greater the downward pushing force on the inserting member, the greater the force level at these four areas of contact.

Due to the symmetrical curvature of the leading and trailing edge portions 56 and 57, the initial areas of contact will in fact be points on the convex outer edges, even though surfaces 43 and 44 push downwardly on the top surfaces of edge portions 56 and 57. However, with continued advancement, these edge points of contact widen slightly into areas of contact due to any metal-to-metal deformation or yielding. There are truly only four primary areas of contact interference and these are designated in FIG. 8 as points A, B, C and D. Due to the 4-degree taper of receiving channel 41, there is an approximate 2-degree offset between the lateral (horizontal) centerline axis of the inserting member and points of contact C and D with the sides of the receiving channel. Points of contact A and B are on the longitudinal (vertical) centerline of the receiving channel (and the inserting member). The result of these four points of contact interference, which are spaced approximately 90 degrees apart, is an assembly concept which is very strong, reliable, and easy to assemble. All that need be done is to simply begin the inserting member at the top end of the receiving member and push it downwardly.

By constructing the flared conical end 49 of the inserting member out of approximately 40 thousandths of an inch thick material, suitable yielding and deformation is permitted to wedge the two parts together such that there is neither lateral rocking or clearance nor longitudinal rocking or clearance. Consequently, there is no possibility for vibrational loads to loosen the two component parts of this mounting apparatus. However, by applying a steady force in the direction of top end 64, the two component parts may be separated in the event the mirror would need to be replaced or repaired. While this particular mounting apparatus concept has been detailed only at the point of pivot mechanism attachment to an automobile windshield, it is to be understood that a similar mounting apparatus could be disposed between the pivot mechanism and the back side of the rear-view mirror. Similarly, this mounting apparatus concept is believed applicable for a tremendous variety of assembly and mounting requirements. In fact, it is envisioned that the inserting member could be of virtually any shape intermediate to its two ends and have the two ends configured with the disclosed flared conical shape. Consequently, by providing two receiving members, one attached to each of the two objects to be joined, a single inserting member could be disposed between the two receiving members, and thereby assemble the two objects together.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mounting apparatus for attaching a first object to a second object comprising:
    an inserting member having a first end adapted for attachment to a first object and a second, opposite end having a hollow, generally conical shape; and
    a receiving member having a first surface adapted for attachment to a second object and a second, opposite surface defining therein a longitudinally extending receiving channel which tapers in the longitudinal direction such that its lateral width decreases, said receiving channel having undercut longitudinal edges, said tapered receiving channel including a bottom surface intermediate between said first and second surfaces and being adapted such that the undercut longitudinal edges slidably receive, in the direction of narrowing taper said second, opposite end and engage said second opposite end at two primary areas of interference contact, said inserting member and said receiving member being cooperatively adapted such that continued advancement of said inserting member in the direction of narrowing taper increases the interference contact at said two primary areas and forces said inserting member against said bottom surface into engagement at two additional primary areas of interference contact which are spaced from said first two primary areas.

2. The mounting apparatus of claim 1 wherein said four primary areas of interference contact are spaced approximately 90 degrees apart.

3. The mounting apparatus of claim 2 wherein said receiving channel is generally symmetrical about a longitudinal centerline and two of said four primary points of interference contact are located substantially on said centerline.

4. The mounting apparatus of claim 1 wherein said receiving member is a substantially flat plate and the undercut longitudinal edges of said receiving channel have a generally dovetail shape in cross section.

5. A mounting apparatus for attaching a first object to a second object comprises:
   an inserting member having a first end adapted for attachment to a first object and a second, opposite end having a generally conical shape; and
   a receiving member having a first surface adapted for attachment to a second object and a second, opposite surface defining therein a longitudinally extending receiving channel which tapers in the longitudinal direction such that its lateral width decreases and which includes undercut longitudinal edges, said tapered receiving channel including a bottom surface intermediate between said first and second surfaces, said inserting member and said receiving member being cooperatively adapted such that continued advancement of said inserting member in the direction of narrowing taper forces said inserting member into contact against said bottom surface at two primary points of interference contact and wherein said second, opposite end includes a bottom edge contoured with two upper side portions disposed in an upper plane and two lower edge portions disposed in a lower plane, said upper and lower planes being substantially parallel to each other, and said lower edge portions being forced into contact against said bottom surface by said advancement in the direction of narrowing taper.

6. The mounting apparatus of claim 5 wherein said two upper side portions are received by the undercut portions of said receiving channel.

* * * * *